United States Patent
Lounsberry et al.

(10) Patent No.: US 11,451,405 B2
(45) Date of Patent: Sep. 20, 2022

(54) ON-DEMAND EMERGENCY MANAGEMENT OPERATIONS IN A DISTRIBUTED COMPUTING SYSTEM

(71) Applicant: MICROSOFT TECHNOLOGY LICENSING, LLC, Redmond, WA (US)

(72) Inventors: Brian Scott Lounsberry, Kenmore, WA (US); Saurav Sinha, Kirkland, WA (US); Chuanxin Fang, Bellevue, WA (US); Ashok Chandrasekaran, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 624 days.

(21) Appl. No.: 16/276,538

(22) Filed: Feb. 14, 2019

(65) Prior Publication Data
US 2020/0267004 A1    Aug. 20, 2020

(51) Int. Cl.
  *H04L 9/32*    (2006.01)
  *H04L 9/08*    (2006.01)
  *G06F 9/455*    (2018.01)

(52) U.S. Cl.
  CPC ........ *H04L 9/3268* (2013.01); *G06F 9/45558* (2013.01); *H04L 9/0891* (2013.01);
  (Continued)

(58) Field of Classification Search
  CPC ... H04L 9/3268; H04L 9/0891; H04L 9/3247; H04L 9/3265; H04L 9/32; H04L 9/08;
  (Continued)

(56) References Cited

U.S. PATENT DOCUMENTS

| | | | | |
|---|---|---|---|---|
| 10,298,577 | B1* | 5/2019 | Aithal | H04L 63/126 |
| 2006/0155855 | A1* | 7/2006 | Hamai | H04L 9/3268 |
| | | | | 709/227 |

(Continued)

OTHER PUBLICATIONS

RSA Authentication Manager 8.1 Administrator's Guide, EMC Corporation, Dec. 2013, p. 369 (Year: 2013).*

*Primary Examiner* — Theodore C Parsons
*Assistant Examiner* — Howard H. Louie
(74) *Attorney, Agent, or Firm* — Shook, Hardy & Bacon L.L.P.

(57) ABSTRACT

Various methods and systems are provided for providing on-demand emergency management. On-demand emergency management includes emergency management operations (e.g., certificate update operations or managed-secrets rollover operations) for accelerated deployment and expedited installation of certificates or secrets. In operation, a host secret manager on a host machine communicates with client secret managers on virtual machines running the host machine, to provide expedited installation of secrets on the virtual machines. During the certificate update operations, the host secret manager communicates the certificate update secret package having a new secret state to a client secret manager that installs the new certificate state on the virtual machine. And, during managed-secrets rollover operations, based on accessing a managed-secrets rollover secret package having a notification-based new secret state, the host secret manager polls a dSMS service, and communicates with a client secret manager, such that client secret manager installs the new secret on the virtual machine.

20 Claims, 8 Drawing Sheets

(52) U.S. Cl.
CPC .......... *H04L 9/3247* (2013.01); *H04L 9/3265* (2013.01); *G06F 2009/45587* (2013.01); *G06F 2009/45595* (2013.01)

(58) Field of Classification Search
CPC ....... G06F 9/45558; G06F 2009/45587; G06F 2009/45595; G06F 9/455
See application file for complete search history.

(56) References Cited

U.S. PATENT DOCUMENTS

| | | | | |
|---|---|---|---|---|
| 2008/0003980 | A1* | 1/2008 | Voss | H04W 12/106 455/411 |
| 2014/0331053 | A1* | 11/2014 | Maruyama | H04N 21/63345 713/175 |
| 2017/0019386 | A1* | 1/2017 | Ylonen | G06F 21/575 |

* cited by examiner

ON-DEMAND EMERGENCY MANAGEMENT OPERATIONS IN A DISTRIBUTED COMPUTING SYSTEM

BACKGROUND

Users often rely on applications and services to perform computing tasks. Distributed computing systems (e.g., cloud computing platforms) host applications and services using computing architectures that support network access to a shared pool of configurable computing and storage resources. A distributed computing system can support building, deploying, and managing applications and services. Users and enterprises are moving away from traditional computing infrastructures to run their applications and services on distributed computing systems. As such, distributed computing system providers are faced with the challenge of supporting the increasing number of users and enterprises sharing the same distributed computing system resources.

By way of example, establishing the root of a certificate is a fundamental requirement for an operating system or cloud computing service. Existing mechanisms do not consistently work for several reasons, including due to race-conditions in the boot path for servers and virtual machines and network connectivity. Existing solutions further include custom code to deploy hard-coded issuers. While some support currently exists for certificate and secrets management, such existing systems lack functionality for addressing emergency management of certificates or secrets in order to distribute public certificate information for the purposes of establishing baseline trust in the system With the ever-increasing use of distributed computing systems, improvements in computing operations for emergency management of certificates and secrets in a distributed computing system, and in particular, distributing certificates and secret states in distributed computing systems, can provide more efficient emergency management in distributed computing systems and efficiency in storage and retrieval of secrets in distributed computing systems.

SUMMARY

Embodiments described herein are directed to methods, systems, and computer storage media, for providing on-demand emergency management operations in distributed computing systems. At a high level, on-demand emergency management in a distributed computing system includes providing operations for distributing public certificate information for the purposes of establishing baseline trust in a system. The system may then establish a baseline trust for transport layer security (TLS), signing, and other certificate related-scenarios. An emergency management system provides a standard and reliable way to manage certificates and rollover of secrets to avoid one-off solutions that lead to confusion and outages during root and intermediate certification related changes or incident.

For example, with reference to certificate updates, the emergency management system can provide operations that push a new certificate goal-state across an entire fleet of hosts and virtual machines without off-machine calls. Certificates are distributed through the hosts by a deployment mechanism. Further, an agent processes the goal-state for both the host and any virtual machines. The emergency management operations can, using a policy, operate to target only hosts or virtual machines that require an update. The agent in the host or virtual machine installs the new root and intermediate certificates from the host to a trusted or untrusted certificate store of an operating system. The goal-state is cached in the host for virtual machine rebuilds and scale-out scenarios.

In this regard, the emergency management operations support establishing trust early enough in a boot-cycle of a host or virtual machine to ensure that all calls from the host or the virtual machine can successfully authenticate when an application or cloud computing agents or services are initialized. Advantageously, the emergency management operations support clearing caches and states related to the cached certificate chains to apply the new state immediate without a reboot. As discussed in detail below, the emergency management operation can further include management of rollover of secrets where an autonomous secret manage system can pull down any new leaf certificates associated with new roots or intermediates. The goal-state can be updated on demand at any time without requiring a deployment or reboot of the server.

By way of background, certificates (e.g., root certificates or intermediate certificates), or other types of secrets, have a lifetime during which they are considered valid. There are several possible ways for a system to lose an established baseline trust. For example, a certificate authority (CA) that uses a cross-trust relationship to another CA could be severed, or a CA could go defunct. Also, when a lifetime expires, the certificate can no longer be used for authentication and must be updated to restore its validity. A certificate can also become invalid from being revoked by a (CA). Other common reasons for which a CA may revoke a certificate can further include a change in operating status or suspicion of a compromised private key. Currently, in distributed computing systems, some support exists for secrets management; however such existing systems lack functionality for addressing emergency scenarios (e.g., update of root certificates and intermediate certificates or rollover of secrets). For example, existing systems have limitations on the ability for early system bootstrapping and the requirement to connect to an external server to retrieve updates. This is not always possible due to networking restrictions (e.g. private virtual networks) or air-gapped computing environments, as discussed in more detail below.

Conventional methods of secrets management fall short of providing a solution for efficiently performing on-demand emergency management. In one example implementation, root certificates and intermediate certificates are embedded or hard-coded into operating system images. While this practice may be suitable for normal operating procedures, this practice presents issues in emergency situations because the operating systems have to be deployed. In another example implementation, simply providing new certificates without performing additional operations to ensure appropriate timely access and utilization of the new certificates is also another limitation of the conventional implementation. For example, race-conditions in the boot path for servers and virtual machines and network connectivity limit the capacity to predictably and consistently distribute certificates in emergencies. As such, improvements to the computing operations, functionality, and technological process of providing on-demand emergency management in distributed computing systems can be defined to address the above-described problems and other limitations in conventional methods and systems of secrets management.

In operation, an on-demand emergency management system performs emergency management operations (e.g., certificate update operations or managed-secrets rollover operations) for accelerated deployment and expedited installation of new secret states. In particular, an on-demand secret manager for the distributed computing system receives a request to perform emergency management operations for certificate updates or rollover of secrets of machines in the distributed computing system. The on-demand secret manager can operate with a secret package store that stores secret packages and a deployment service. The deployment service supports deployments to heterogeneous machines in the distributed computing system environment. The on-demand secret manager, based on the request, determines whether to initiate certificate update operations or managed-secrets rollover operations. In particular, certificate update operations are associated with a certificate update secret package having a new secret state, and managed-secrets rollover operations are associated with a managed-secrets rollover secret package having a notification-based new secret state. During either the certificate update operations or the managed-secrets rollover operations, the on-demand secret manager triggers deployment, via a secret package store, of certificate update secret packages or the managed-secrets rollover secret package to host machines in the distributed computing system.

In addition, a host secret manager operating on one of the host machines is configured to communicate with client secret managers on virtual machines running the host machine to provide expedited installation of secrets on the virtual machines. In particular, during the certificate update operations, the host secret manager communicates the certificate update secret package received from the secret package store to a client secret manager of a virtual machine. The client secret manager operates autonomously to expeditiously install the new secret state of the on the virtual machine. And, during managed-secrets rollover operations, the host secret manager listens for the managed-secrets rollover secret package in the secret package store, and accesses the managed-secrets rollover secret package to cause the client secret manager to poll a distributed secrets management service ("dSMS") for a new secret. The client secret manager operates with dSMS managed operations to expeditiously install a new secret in a client secret store of the virtual machine. As discussed in more detail below, the emergency management operations can further include additional operations such as, customization and tailoring of emergency management operations functionality (e.g., accelerated deployment and expedited installation), signing and verifying the certificate update secret package and the managed-secrets rollover secret package, expeditiously installing secrets in host secret stores in host machines, and flushing secret caches of host machines and virtual machines.

As such, embodiments described herein improve the computing operations, functionality, and the technological process for providing on-demand emergency management, in that emergency management operations (e.g., certificate update operations or managed-secrets rollover operations) support accelerated deployment and expedited installation (autonomous or managed) of secret states based on an on-demand emergency management system. In particular, data structures designed to store and retrieve secrets, the ordered combination of steps for performing on-demand emergency management operations, between components in a non-generic arrangement, result in computing improvements and efficiency in providing on-demand emergency management for distributed computing systems.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
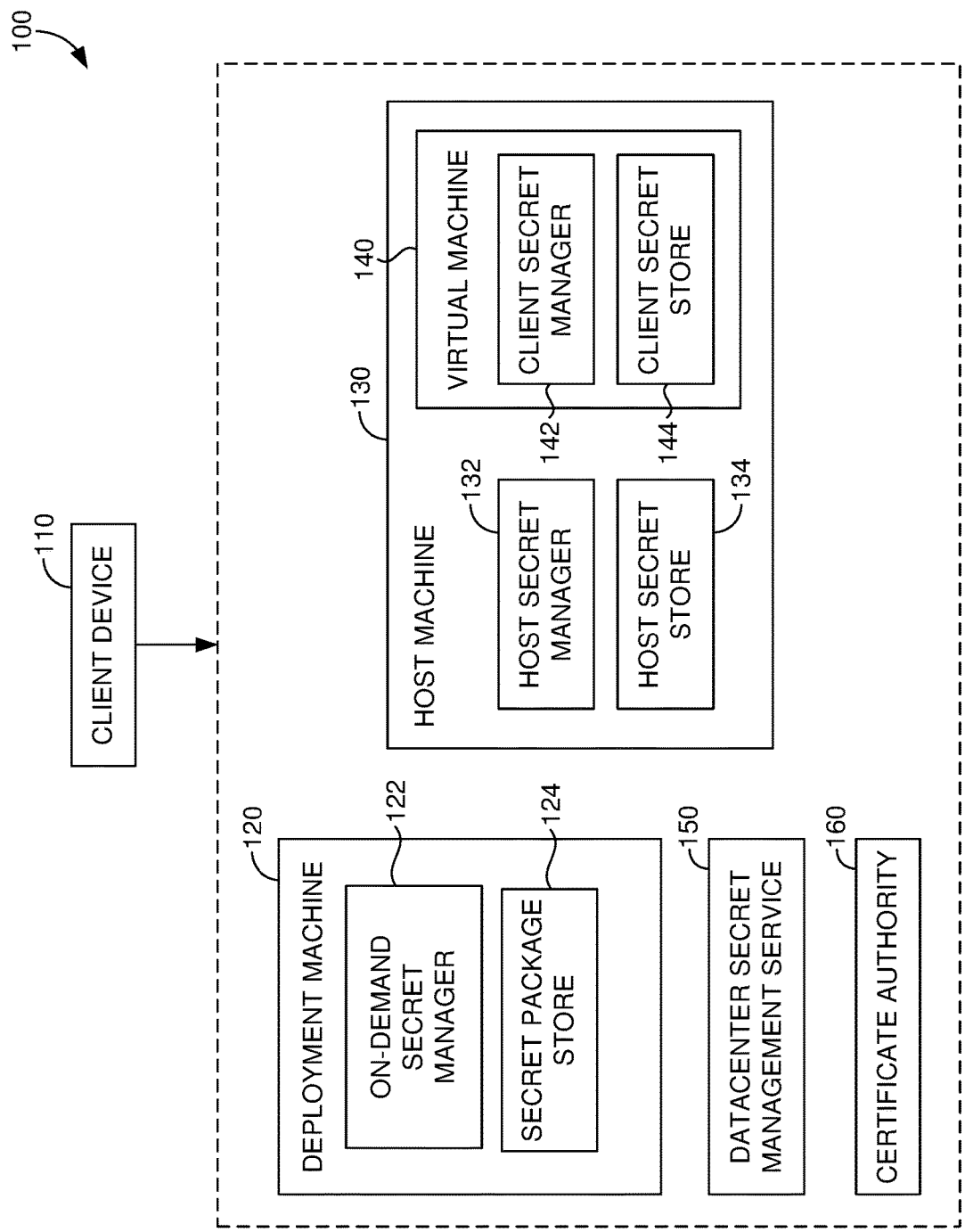
FIG. 1 is a block diagram of an example on-demand emergency management system, in which embodiments described herein may be employed.

Users may use a distributed computing system or cloud computing platform for secured computing operations that are used for different types of applications and services. For example, secrets in computing systems can be used to create secured connections to a server via the internet and secure communications between computing devices. Distributed computing systems may be secured based on secrets such as certificates, passwords, storage account keys, shared access signatures (SAS), and the like. In particular, a certificate is essential in order to circumvent a malicious part which happens to be on the route to a target server, which acts as if it were the target (e.g., a man-in-the middle attack). A client uses a certificate authority (i.e., an entity that issues digital certificates) to authenticate the certificate authority signature the service certificate, as part of the authorization before launching a secure connection. A certificate authority may issue a root certificate to issue multiple intermediate certificates with varying validation requirements. Generally, secrets can be implemented based on corresponding life cycle. At the end of life or other reasons, the secret can expire or otherwise become invalid and/or untrusted. As such, secrets need to be renewed from time to time. In distributed computing systems in which resources such as secrets can be distributed, managing such distributed secrets poses various challenges.

Distributed computing systems implement secrets management (e.g., periodically rollover of secrets) to ensure the security of communications and computing devices in the distributed computing system. For example, a distributed computing system can implement a distributed secrets management service (dSMS) that manages certificates that are rotated on host machines and virtual machines in the distributed computing system as detailed in U.S. patent application Ser. No. 15/920,832, filed Mar. 14, 2018, entitled "AUTONOMOUS SECRETS RENEWAL AND DISTRIBUTION", which is herein incorporated by reference in its entirety.

dSMS operates with different types of secret issuers and managers. For example, the dSMS operates with a certificate authority (CA) that manages certificates. Digital Certificates are verifiable small data files that contain identity credentials to help websites, people, and devices represent their authentic online identity (authentic because the CA has verified the identity). CAs play a critical role in trusted transactions by issuing certificates that are used to protect information, encrypt and enable secure communication. Other variations and combinations of secret issues are contemplated with embodiments of the present invention. In operation, the dSMS can automatically renew secrets according to a specified rollover policy, and polling agents for an associated service can fetch updates from dSMS. In one example dSMS implementation, the run-time secrets distribution may operate based on an eventual consistent model; in other words, the secrets may be rolled out using a piece-meal approach with the expectation that an indefinite time in the future all computing devices will eventually receive updated secrets.

Conventional secret management systems lack support for handling unexpected occurrences, in a distributed computing system environment, which require immediate action including system-wide on-demand update of certificates or rollover of secrets. In particular, emergency situations may necessitate broad update of certificates or rollover of secrets in a short turnaround (e.g., hours) period. For example, a root certificate or intermediate certificate may be revoked, requiring updates to the certificate, or other potential failure modes, related to availability of security, may trigger an immediate need to update certificates. In the event of such an emergency, a central and automated process for emergency management of certificates and secrets across the entire distributed computing environment would avoid or dramatically reduce the impact of the outage.

Conventional methods of secrets management also fall short of providing a solution for efficiently performing on-demand emergency management for the reasons provided below. At a high level, existing systems have limitations on the ability for early system bootstrapping and the requirement to connect to an external server to retrieve updates. This is not always possible due to networking restrictions (e.g. private virtual networks) or air-gapped computing environments. Race-conditions in the boot path for servers and virtual machines and network connectivity limit the capacity to predictably and consistently distribute certificates in emergencies. In another example implementation, it is common to embed or bake-in root certificates and intermediate certificates into operating system images. While this practice may be suitable for normal operating procedures, the practice presents issues in emergency situations. For example, an operating system image would have to be updated with a new certificate and then also deployed to all machines targeted for the new certificate. However, both of these steps introduce significant delay and cost, especially in emergency situations where immediate action is required. In another example implementation, simply providing new certificates without performing additional operations to ensure appropriate access and utilization of the new certificates is also another limitation of the conventional implementation. For example, host machines or virtual machines may boot up and remain idle, waiting on other operations, which delay the ability to access and utilize the new certificate or secret.

In another example, new machines often cache secret information that may still be accessed even after the new certificates are provided to the machines, if appropriate actions are not taken to make sure the cached secret information is no longer available or accessible. With regard to virtual machines (VM), the initialization process (e.g., provisioning or rebooting) of VMs may lack the configuration to immediately initialize with a new certificate state while circumventing initialization tasks that cause delays in the VM initialization. For example, when a VM is initializing, there are no trusted root certificates, or an existing root certificate may be untrusted, and as such cannot be relied on. A dSMS client component on the client that supports configuration of the certificate may not be able to be able establish an SSL connection with the dSMS server.

In some conventional systems, certificate distribution cannot be performed in an offline model. The types of update mechanisms also have limitations in that they may explicitly require internet connectivity instead of the capacity to rollout certificates through a host. In particular, the virtual machines running on host machines are not configured to perform operations independently of the host machines by virtue of the inherent dependent configuration relationship of virtual machines operating of host machines. Moreover, ad-hoc implementations lack the centralized management and support that an on-demand heterogeneous infrastructure solution provides. Emergency manager of certificates and secrets across a heterogeneous infrastructure, having different types of ad-hoc solutions, can be time-consuming, unpredictable, and expensive. As such, a comprehensive on-demand certificate state distribution management system with an alternative basis for executing emergency managements operation can improve computing operations in a distributed computing system.

Embodiments described herein provide simple and efficient methods and systems for implementing an on-demand emergency management system that performs emergency management operations. In particular, on-demand emergency management can be emergency management operations (e.g., certificate update operations or managed-secrets rollover operations) for accelerated deployment and expedited installation (autonomous or managed) of secret states during unexpected occurrences in a distributed computing system environment that require immediate action.

At a high level, the on-demand emergency management operations support centralized rollover management for rollover of secrets, whenever required or as soon as they are required, with the capacity for customization and tailoring of rollover features (i.e., accelerated deployment and expedited installation) in a distributed computing system. In particular, host secret managers and client secret managers ("managers") are configured to perform on-demand emergency management operations that support prioritization of the installation of new secret states on the host machines and virtual machines using deployment service infrastructure.

In a simplified characterization of the emergency management operations, the invention includes deploying secret packages (e.g., a new secret state, notification-based new secret state, signing file—collectively "secret package data")

to host machines and virtual machines that can automatically access the secret packages and trigger the appropriate operations and actions to achieve a desired secret state. The host machine and virtual machine operations can be specifically prioritized over other operations to expeditiously install a new secret state on the machines, as discussed in more detail. In particular, a new secret state (e.g., new certificate state) is installed (autonomously during certificate update operations and managed during managed-secrets rollover operations) across machines in a distributed computing system. In particular, the machines are able to quickly establish trust compared to rolling distribution and installation (e.g., eventually consistent) of certificates or secrets. Advantageously, on-demand emergency management includes operations to flush caches and state related to cached certificate chains to apply the new state immediately without a reboot. In other words, a primary goal of the on-demand emergency management system is providing support for updating certificates and rollover of secrets, using emergency management operations, at the earliest possible time in the provisioning process in the distributed computing system using a deployment service.

A deployment service generally refers to technology that supports installation of operation systems, applications, and services. The deployment service infrastructure can be a new or repurposed deployment service infrastructure, beyond a classic build release flow for deployment of host images of virtual machine (VM) images. With embodiments described herein, a repurposed deployment service infrastructure can include a deployment machine having an on-demand secret manager and a secret package store operating with managers on the host machines and virtual machines to specifically perform operations in emergency situations. Any number of incidents may trigger the emergency management operations including: an issue with the certificate authority infrastructure, a trust issue with an intermediate, adding another intermediate certificate, or any other nefarious or non-nefarious triggers to perform emergency management operations. The deployment service operates with a heterogeneous collection of machines performing different types of operations in the distributed computing system. The deployment service can ordinarily support automated installations using disk images and operate with a dSMS that provides normal secrets management operations.

The deployment service supports operations for accelerated deployment of rollover secrets. The deployment service can include an administrative client and a deployment machine supporting the deployment service functionality. The deployment service is responsible for providing generating, customizing, tailoring, and deploying secret packages. For example, the administrative client may generate a request for emergency management operations, where an on-demand secret manager on the deployment machine that provides an interface for defining and implementing the logic, policies, tasks, and machines for the request. The request is used to generate a secret package that is stored in a shared location (e.g., secret package store) of the deployment service to then trigger deployment per the attributes of the rollover requires.

The deployment service is also responsible for causing installation of components of the on-demand emergency management system to host machines and virtual machines that access the secret package to perform emergency management operations. The host machines and virtual machines can be configured with host secret managers and client secret managers ("managers"), respectively to support functionality described herein. For example, the manager can be a shared service of the deployment service running on the host machines and the virtual machines that pull certificates or secrets at run-time from the host or from dSMS.

The deployment service can push the managers in advance of emergency management operations, where the managers support the deployment operations of the emergency management operations. For example, a manager may be part of an initial provisioning image for the host machines or virtual machines where a stage map (e.g., topology of different machines in the distributed computing system) can be used to target and push managers to machines. Other variations and combinations of operations for advance configuration of machines with their corresponding managers are contemplated with embodiments described herein.

The deployment service may use the stage map such that new secret states are pushed out uniformly with support at the managers on the host machines and virtual machines. For example, the managers can be installed on host machines and virtual machine images with configurations (e.g., functions and Application Programming Interfaces "APIs") built into the managers to support emergency management operations.

In one embodiment, the managers operate as pre-installation environments that are triggered as part of the emergency management operations to prioritize installation of new secrets over other operations that would normally be performed upon reboot of host machines or virtual machines. For example, the client secret manager can support an API that provides the capacity for the client secret manager to query certificate update secret packages from a host machine and install certificates on the virtual machine. The query will return the certificate update secret package as a payload encoded in a JSON file. The host secret manager also similarly operates to query and install the certificate update over secret package on the host machine.

Prioritizing installation of new secrets can explicitly include pre-empting execution of other booting and initialization operations to perform specific rollover operations that facilitate immediate access to new secrets. For example, the managers can execute cache flushing operations to prevent access to cached version of secrets so that the new secrets can take immediate effect upon performing emergency management operations without a reboot. The managers also operate with corresponding secret stores (e.g., client secret store or host secret store) where, for example, certificates are installed or secrets are stored in certificate stores or secure Blob file stores as part of the prioritized operations.

As discussed, a request is received, then a secret package is generated and made accessible via a secret package store. The request can be used for centralized management or configuration of the emergency management operation. For example, the request may be customized and tailored to achieve specific goals for the emergency management operations. The logic, policies, tasks, and selective identification machines for the request can be defined on the administrator client or the deployment machine as part of the request and also as part of the generating the secret package.

Different types and configurations of secret packages may exist, for example, a secret package may be configured for certificate update operations or managed-secrets rollover operations. For example, features of the deployment service or of the rollover functionality can be defined used to define the logic, policies, tasks, and selective identification machines. For example, the deployment service can support selectively identifying machines and corresponding logic, policies, and task for performing operations on those machines using secret data in the secret packages, where the managers are configured to access secret packages and perform operations based on the type of secret package.

The managers may also specifically communicate using an endpoint. An endpoint may be configured within the host machine such that the host secret manager and the client secret manager can communicate. An endpoint can refer to a communication mechanism that generally supports secure communications between machines in a distributed computing environment. The endpoint, as used herein, may be a part of (e.g., a feature of) the host secret manager. Endpoints can be configured for different types of platform services. For example, service endpoints may be configured on a subnet in a virtual network. Endpoints work with any type of compute instances running within that subnet. As such, secret package can be processed using an endpoint in the host machine.

Each type of secret package has corresponding operations for the managers that are performed to ensure secret rollover. In particular, the secret package may further include instructions on what operations should be performed and how the operations should be performed. For example, the new secret state for a certificate update can include instructions such as put an intermediate certificate A in a trusted store, intermediate B in an untrusted store, and remove intermediate C, and flush cache. In this regard, when the managers trigger the pre-installation environment, the manager has appropriate access to resources to execute the instructions defined in the new secret state.

It is contemplated that certificates may be installed in trusted or untrusted stores. In this regard, managers are programmed or configured with appropriate rights to perform anticipated emergency management operations to update certificates or rollover secrets. For example, the emergency management operations can further support certificate cache flushing so that any new certificates can take immediate effect without any cached certificate triggering errors after the actual secrets have been rotated. Other variations and combinations of using the deployment service to configure logic, policies, tasks, and selective identification machines for implementing the emergency management operations are contemplated as part of the request and secret package generation in accordance with embodiments of the present invention.

The emergency management operations include certificate update operations and managed-secret rollover operations. Certificate update operations can be performed to autonomously update root certificates or intermediate certificates. Operationally, the certificate update operations can be initiated through an administrator client that (e.g., based on a business approval process) communicates a request to perform the certificate update operations. The request can be received at an on-demand secret manager that determines that the request is for certificate update operations. A certificate update secret package can be generated using the on-demand secret manager that is part of a deployment service. The certificate update secret package can include secret package data. Secret package data can include different types of information used during the certificate update operations. For example, the secret package data can include a new secret state (e.g., a new secret state file) having the root certificates or intermediate certificates. In some embodiments, the new secret state is signed with a private key. The certificate update secret package can be stored in a secret package store, which may be a share location that is securely accessible. The on-demand secret manager can trigger deployment of the certificate update secret package to host machines.

At a given host machine, the host secret manager can initialize certificate update operations on the host machine. The operations may include accessing the certificate update secret package to install the new secret state on the host machine. The virtual machine can include a client secret manager that communicates with the host machine (e.g., an endpoint) to request the certificate update secret package. Upon receiving the certificate update secret package, the client secret manager verifies the signature of the new secret state and installs the certificates on the client secret store. For added security, it is contemplated that the managers can verify the owner of the certificate update secret package using a signing certificate. For example, the signing certificate can be embedded in the manager binary (i.e., an embedded mechanism or image-embedded mechanism) such that a signing public key infrastructure (PKI) is not changed. A list of certificates in the certificate update secret package can be signed, at the time the certificate update secret package is generated, using the signing private key.

With reference to the managed-secrets rollover operations, in accordance with embodiments of the present invention, managed-secrets rollover operations can be performed to operate with dSMS management operations to rollover secrets. Operationally, the managed-secrets rollover operations can be initiated through an administrator client (e.g., based on a business approval process) communicates a request to perform the managed-secrets rollover operations. The request can be received at an on-demand secret manager that determines that the request is for managed-secrets rollover operations. The on-demand secret manager triggers a secret rollover in dSMS for any identified secrets and services to be rolled over per the request. For example, secrets can be rolled over in a CA or other types of secret resource managers, such that, the automated process of rolling over secrets using managed-secrets rollover operations are performed. A managed-secrets rollover secret package can be generated using the on-demand secret manager that is part of a deployment service.

The managed-secrets secret package can include secret package data. Secret package data can include different types of information used during the managed-secrets rollover operations. For example, the secret package data can include a notification-based new secret state (e.g., a notification-based new secret state file) that has a "refresh now" notification. In some embodiments, the new secret state is signed with a private key. The managed-secrets rollover secret packaged can be stored in a secret package store, which may be a share location that is securely accessible. The on-demand secret manager can trigger deployment of the managed-secrets rollover secrets package to host machines.

At a given host machine, the host secret manager can initialize managed-secrets rollover operation on the host machine. The operations may include listening for updates to the secret package store to cause polling dSMS to refresh secrets in the host secret store. The virtual machine can include a client secret manager that communicates with the host machine (e.g., an endpoint) that communicates managed-secrets rollover secrets package such that the notification-based new secret state triggers the client secret manager to poll dSMS to refresh secrets in the client secret store. In one embodiment, the client secret manager may add certificates to a certificate store and secrets to a secure Blob file.

The client secret manager can further notify local apps that secrets are updated using an existing dSMS function.

Accordingly, emergency management operations include a host secret manager on a host machine that communicates with client secret managers on virtual machines running on the host machine, to provide expedited installation (autonomously or managed) of secrets on the virtual machines. During the certificate update operations, the host secret manager communicates the certificate update secret package to a client secret manager that expeditiously installs the new certificate state on the virtual machine. And, during managed-secrets rollover operations, the host secret manager listens for the managed-secrets rollover secret package in the secret package store, and accesses the managed-secrets rollover secret package to cause the client secret manager to poll a dSMS for a new secret. The client secret manager is configured to expeditiously install a new secret state in a client secret store of the virtual machine.

Advantageously, the host machines and virtual machines can execute the on-demand emergency management operations as described herein without having internet connectivity. Internet connectivity is not required to perform the on-demand emergency management operations because the host machines and virtual machines include managers that have access to the secret package store without internet connectivity. It is also contemplated that the emergency management operations are compatible with an air-gapped distributed computing environment (air-gapped cloud), which refers to a set of physically isolated of machines in the air-gapped cloud using a network security measure, where the machines are isolated from unsecure networks, such as the public internet or an unsecured local area network. An air-gapped cloud can be configured with managers, as discussed herein, and provided secure access to the same secret package store (as non-air-gapped cloud) to trigger emergency management operations on the isolated machines in the air-gapped cloud.

As such, the embodiments described herein improve the computing operations, functionality, and the technological process for providing on-demand emergency management, in that emergency management operations (e.g., certificate update operations or managed-secrets rollover operations) support accelerated deployment and expedited installation (autonomous or managed) of secret states based on an on-demand emergency management system. In particular, data structures designed to store and retrieve secrets, the ordered combination of steps for performing on-demand emergency management operations, between components in a non-generic arrangement, result in computing improvements and efficiency in providing on-demand emergency management for distributed computing systems.

With reference to FIG. 1, embodiments of the present disclosure can be discussed with reference to an example on-demand emergency management system 100. FIG. 1 shows a high level architecture of an on-demand emergency management system 100 having components in accordance with implementations of on-demand emergency management of the present disclosure. Among other managers, components, or engines (collectively "components") not shown, on-demand emergency management system 100 includes client computing device 110, deployment machine 120 having an on-demand secret manager 122 and a secret package store 124, a host machine 130 having host secret manager 132 and a host secret store, and a virtual machine 140 having a client secret manager 142 and a client secret store 144, datacenter secret management service ("dSMS" 150) and certificate authority 160. In combination, the components of on-demand emergency management system 100 support functionality of the on-demand emergency management system 100 as described herein in more detail.

The on-demand emergency management system can be a distributed computing environment such as the distributed computing system 800 described with reference to FIG. 8, for example, which is an operating environment for implementing functionality described herein. The components of the on-demand emergency management system 100 include components of a distributed computing system that communicate with each other over one or more networks (e.g., public network or virtual private network "VPN"). The network (not shown) may include, without limitation, one or more local area networks (LANs) and/or wide area networks (WANs). For example, the client computing device 110 may be used to support on-demand emergency management operations described herein. The client computing device 110 may include any type of computing device, such as the computing device 900 described with reference to FIG. 9, for example. A plurality of client computing devices 110 and components may be associated with the on-demand emergency management system. Each of the identified components may represent a plurality of different instances of the component.

Figure 2:
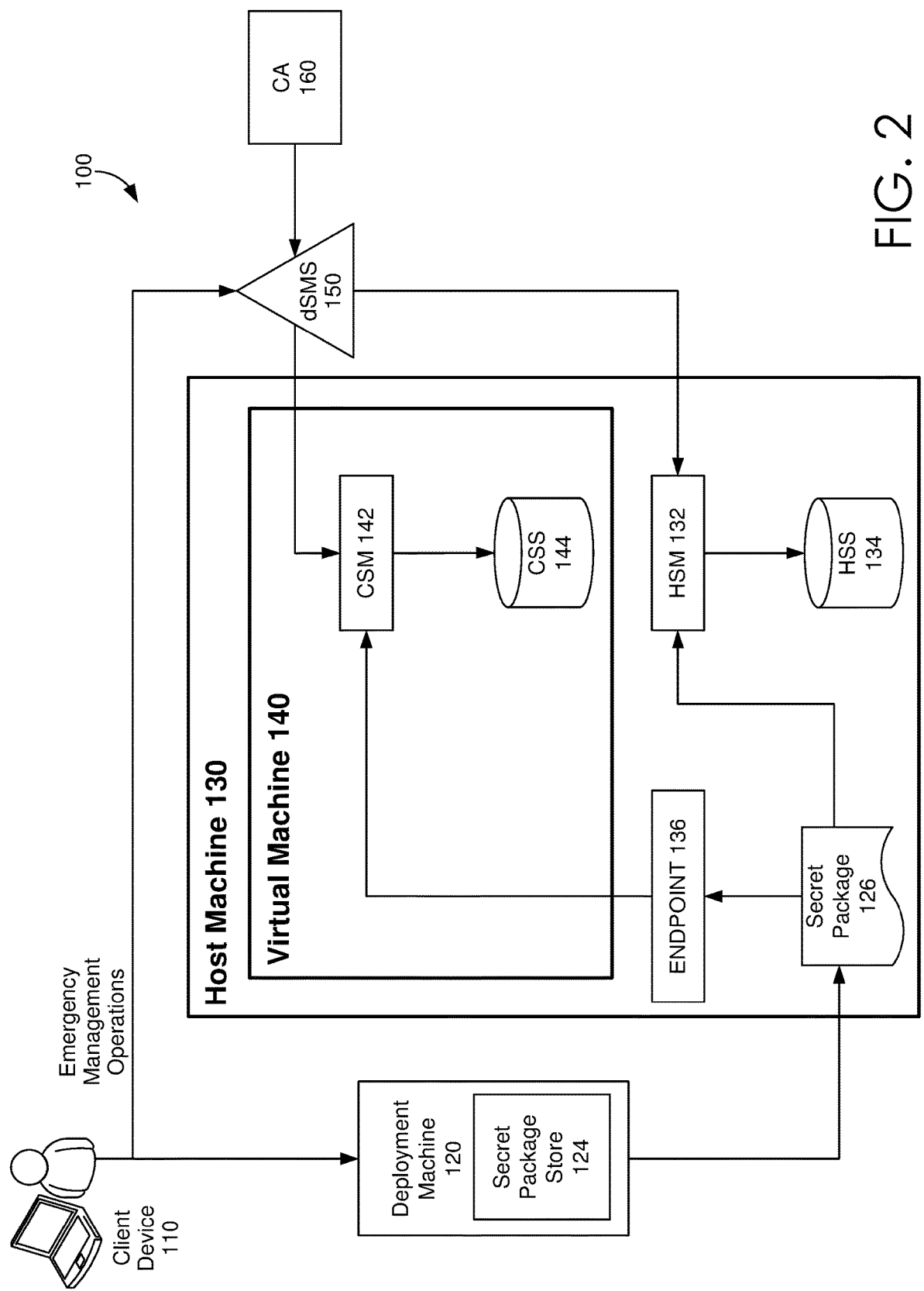
FIG. 2 is a block diagram of an example on-demand emergency management system configured for emergency management operations, in which embodiments described herein may be employed.

With reference to FIG. 2, an example environment for performing emergency management operations in the on-demand distributed computing system 100. The components of FIG. 2 correspond to the components described in FIG. 1. In addition to the components in FIG. 1, FIG. 2 further includes the secret package 126, and endpoint 136, illustrated separately, from the host secret manager 132. On-demand emergency management can be emergency management operations (e.g., certificate update operations or managed-secrets rollover operations) for accelerated deployment and expedited installation (autonomous or managed) of secret states during unexpected occurrences in a distributed computing system environment that require immediate action. At a high level, the deployment machine 120 supports accelerated deployment of the secret package 126 and the host secret manager 132 operating on one of the host machine 130 is configured to communicate with the client secret manager 142 on the virtual machine 140 running the host machine 140 to provide expedited installation of new secrets.

In particular, during the certificate update operations, the host secret manager 132 accesses and communicates the secret package 126 received from the secret package store 124 to the client secret manager of a virtual machine. The client secret manager 142 operates autonomously to expeditiously install a new secret state, of the secret package 126, in the virtual machine. And, during managed-secrets rollover operations, the host secret manager 132 listens for the managed-secrets rollover secret package in the secret package store 124, and accesses the secret package 126 to cause the client secret manager 142 to poll a dSMS 159 for a new secret. The client secret manager 142 is configured to operate with dSMS management operation to expeditiously install a new secret state, of the secret package 126, in the client secret store 142 of the virtual machine.

As discussed in more detail below, with reference to FIG. 3 and FIG. 4, the emergency management operations can further include additional operations such as signing and verifying the certificate update secret package and the managed-secrets rollover secret package, expeditiously installing secrets in host secret stores in host machines, flushing secret caches of host machines and virtual machines, and selectively executing emergency management operations for heterogeneous machines in a distributed computing environment.

Figure 3:
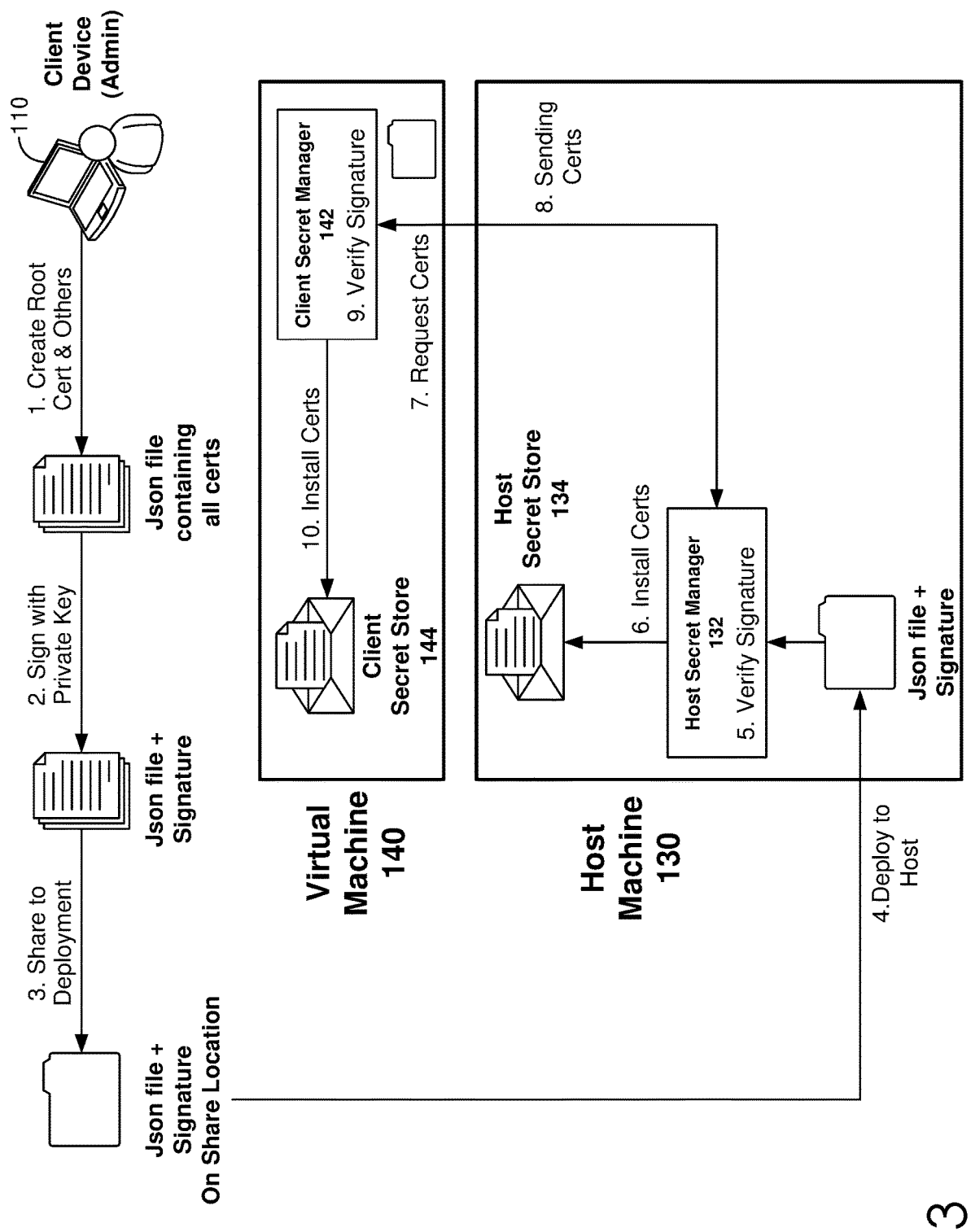
FIG. 3 is a block diagram of an example on-demand emergency management certificate update operations, in which embodiments described herein may be employed.

With reference to FIG. 3, certificate update operations in accordance with embodiments of the present invention are provided. By way of example, in the root or intermediate certificate update scenario, a host machine 130 and virtual machine 140 may not trust a root certificate, for example, due to a security compromise. In this scenario, special considerations are required because the certificate distribution infrastructure for remediating untrusted root and certificate issue may also be untrusted (e.g., a dSMS endpoint). As such, a certificate update secret package having a new secret state is generated and communicated to the host machine 130 and virtual machine 140. In particular, at step 1, an administrator at the client device 110 may create a certificate update secret package (e.g., root certificates and other intermediate certificates) for a request. For example, a JSON file containing a list of certificates is created. At step 2, the certificate update secret package may be signed for added security. For example, a signature file is signed against the JSON file. At step 3, the certificate update secret package containing a new secret state is stored at a share location (i.e., JSON file and signature on share location). At step 4, the certificate update secret package is deployed to the host machine 130 (e.g., using a deployment machine of a deployment service).

In one embodiment, at the host machine 130, the host secret manager 132 may periodically check to see if a certificate update secret package exists and a corresponding timestamp of the certificate update secret package. If a certificate update secret package exists, the host secret manager 132 reads the certificate update secret package, and at step 5, verifies the signature, and at step 6, installs the certificate in the host secret store 134. And on the virtual machine 140, the client secret manager 142 sends a request for the certificate update secret package (i.e., at step 7, requests certs). The client secret manager 142 may communicate with an endpoint (not shown) of the host machine 130 that facilitates returning the certificate update secret package (i.e., at step 8, sending certs) when the certificate update secret package exists. The client secret manager 142 also operates to periodically check if the certificate update secret package exists. At step 9, the client secret manager 142 verifies the signature and, at step 10, installs the certificate in the client secret store.

Figure 4:
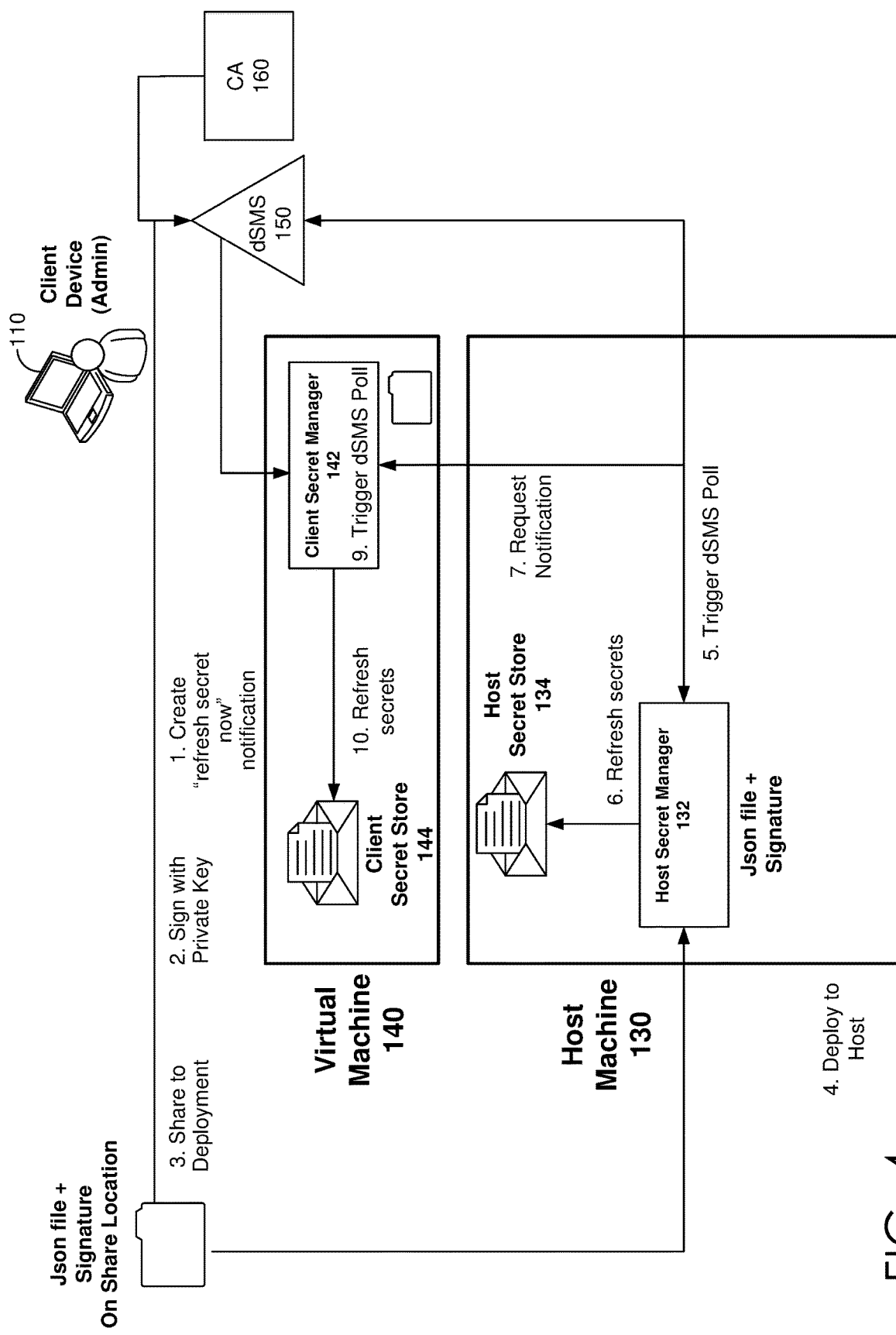
FIG. 4 is a block diagram of an example on-demand emergency management managed-secrets rollover operations, in which embodiments described herein may be employed.

With reference to FIG. 4, managed-secret rollover operations in accordance with embodiments of the present invention are provided. In managed-secret rollover operations, the certificates may be updated at run-time of a service. In one example implementation, once a service is appropriately on-boarded to dSMS, a certificate can be rotated automatically, and distributed securely in an accelerated manner in an emergency. Secrets can be rolled over in the CA 160 or other types of secret resource managers such that the automated process of rolling over secrets using managed-secrets rollover operations are performed.

The on-demand secret manager can trigger a secret rollover in dSMS for any identified secrets and services to be rolled over per a request. In particular, at step 1, an administrator at the client device 110 may create a managed-secrets rollover secret package (e.g., "refresh secret now" notification) for a request corresponding to the secrets request for dSMS. For example, a JSON file containing the "refresh secret now" notification is created. At step 2, the managed-secrets rollover secret package may be signed for added security. For example, a signature file is signed against the JSON file. At step 3, managed-secrets rollover secret package containing a notification-based new secret state is stored at a share location (i.e., JSON file and signature on share location). At step 4, the managed-secrets rollover secret package is deployed to the host machine 130 (e.g., using a deployment machine (not shown) of a deployment service).

In one embodiment, at the host machine 130, the host secret manager 132 may periodically listen to see if the managed-secrets rollover secret package exists in the share location. If the managed-secrets rollover secret package exists, the host secret manager triggers a poll to dSMS to expeditiously refresh secrets (i.e., step 6, refresh secrets) for the host machine 130. It is contemplated that the managers during the managed-secrets rollover operations may also optionally perform operations described herein with reference to the certificate update operation (e.g., verifying a signature of the managed-secrets rollover package or use an endpoint to communicate with the host secret manager). The client secret manager 142 may communicate with the host machine that facilitates returning the managed-secrets rollover secret package (i.e., step 7, request notification). The client secret manager 142 triggers a poll to dSMS to expeditiously refresh secrets (i.e., step 10, refresh secrets) for the virtual machine 140. The client secret manager 142 may notify local applications that secrets are updated (e.g., using a dSMS component not shown in the virtual machine).

Example Flow Diagrams

Figure 5:
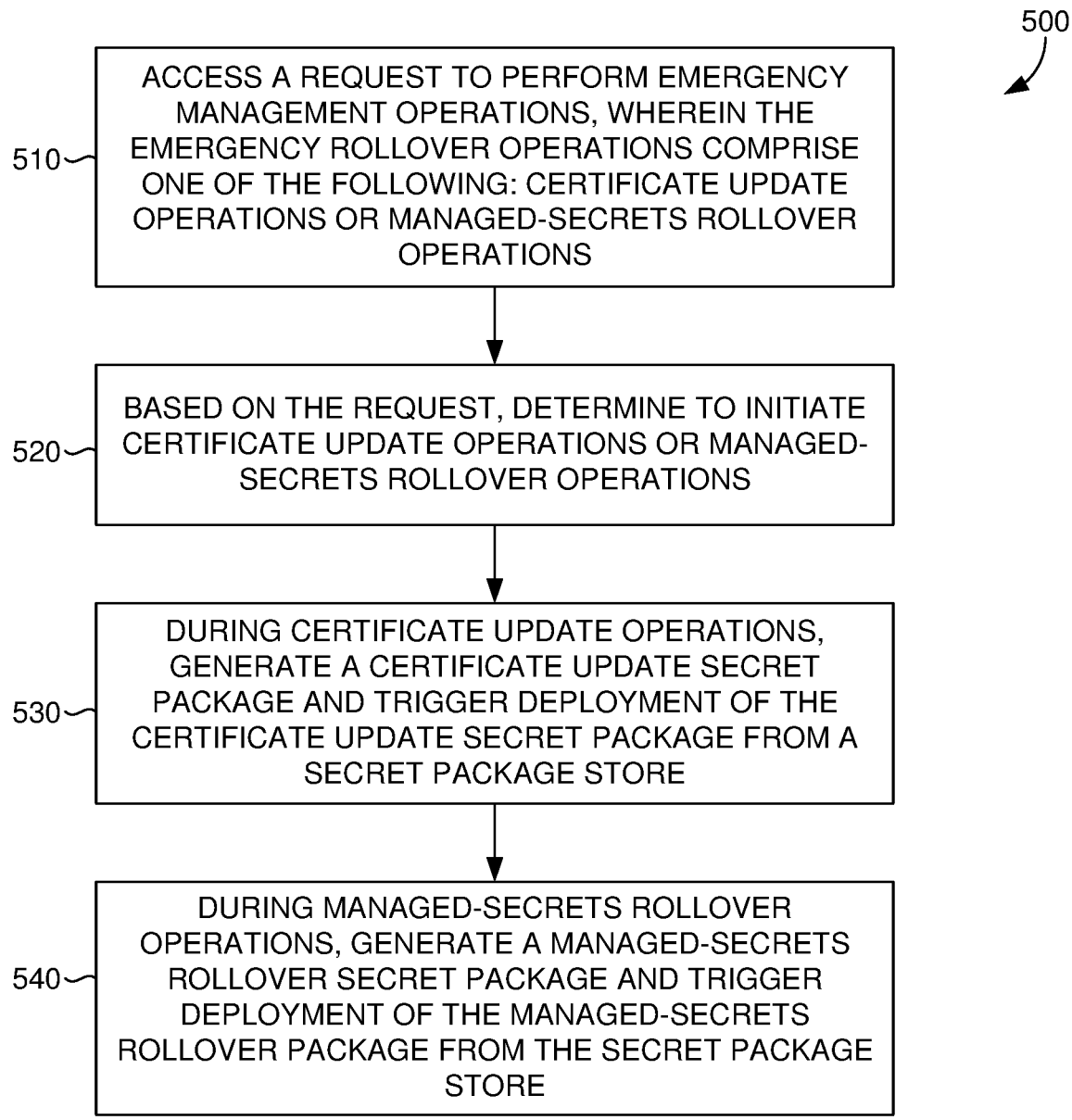
FIG. 5 is a flow diagram showing an example method for implementing an on-demand emergency management system, in accordance with embodiments described herein.
Figure 6:
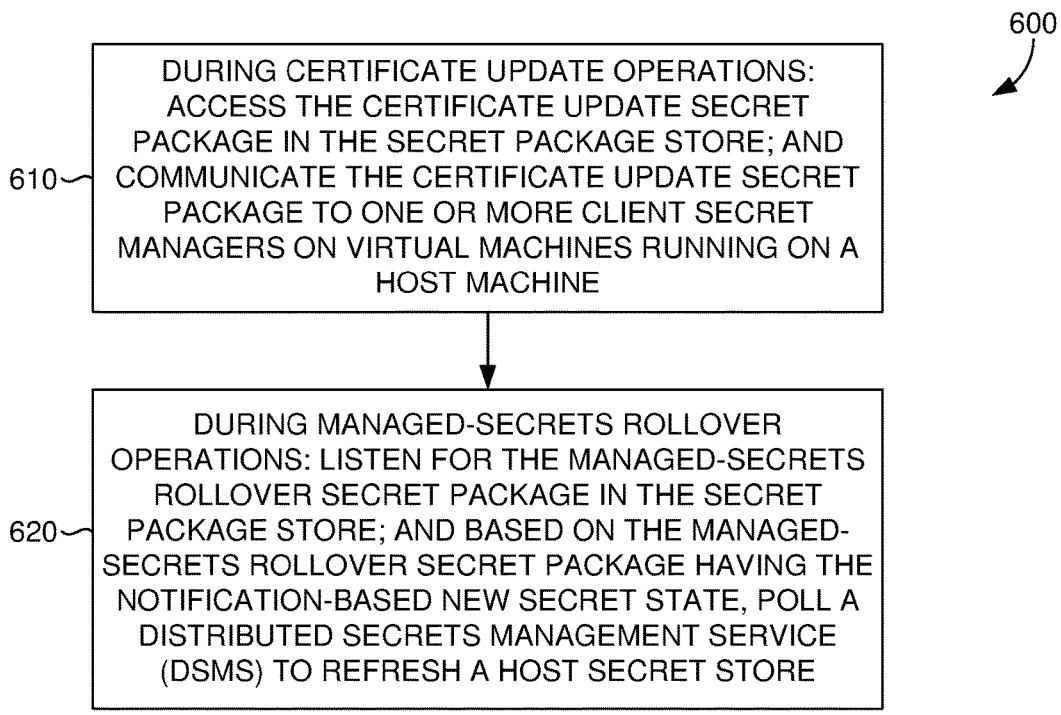
FIG. 6 is a flow diagram showing an example method for implementing an on-demand emergency management system, in accordance with embodiments described herein.
Figure 7:
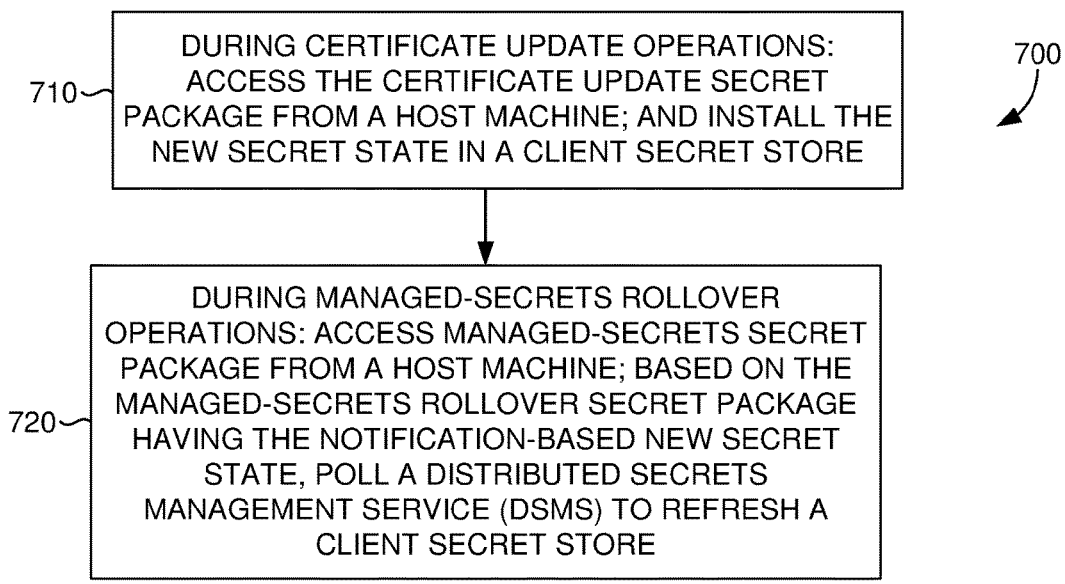
FIG. 7 is a flow diagram showing an example method for implementing an on-demand emergency management system, in accordance with embodiments described herein.

With reference to FIGS. 5, 6 and 7, flow diagrams are provided illustrating methods for providing an on-demand emergency management system. The methods can be performed using the on-demand emergency management system described herein. In embodiments, one or more computer storage media having computer-executable instructions embodied thereon can, when executed by one or more processors, cause the one or more processors to perform the methods in the on-demand emergency management system.

Turning now to FIG. 5, a flow diagram is provided that illustrates a method 500 for on-demand secrets distribution in distributed computing systems. Initially, at block 510, a request is accessed to perform emergency management operations. The emergency management operations comprise one of the following: certificate update operations or managed-secrets rollover operations. At block 520, based on the request, a determination to initiate certificate update operations or managed-secrets rollover operations is made. At block 530, during certificate update operations, a certificate update secret package is generated and a deployment of the certificate update secret package from the secret package store is triggered. At block 540, during managed-secrets rollover operations, a managed-secrets rollover secret package is generated and a deployment of the managed-secrets rollover package from the secret package store is triggered.

Turning now to FIG. 6, a flow diagram is provided that illustrates a method 600 for on-demand secrets distribution in distributed computing systems. Initially, at block 610, during certificate update operations, the certificate update secret package is accessed in the secret package store and communicated to one or more client secret managers on virtual machines running on a host machine. At block 630, during managed-secrets rollover operations, the managed-secrets rollover secret package is listened for in the secret package store and based on the managed-secret rollover secret package having the notification-based new secret state, a distributed secrets management service is polled to refresh a host secret store.

Turning now to FIG. 7, a flow diagram is provided that illustrates a method 700 for on-demand secrets distribution in distributed computing systems. Initially, at block 710, during certificate update operations, the certificate update secret package is accessed from a host machine and the new secret state is installed in a client secret store. At block 720, during managed-secrets rollover operations, the managed-secrets rollover secret package is accessed from a host machine, and based on the managed-secret rollover secret package having the notification-based new secret state, a distributed secrets management service is polled to refresh a client secret store.

Example Distributed Computing Environment

Figure 8:
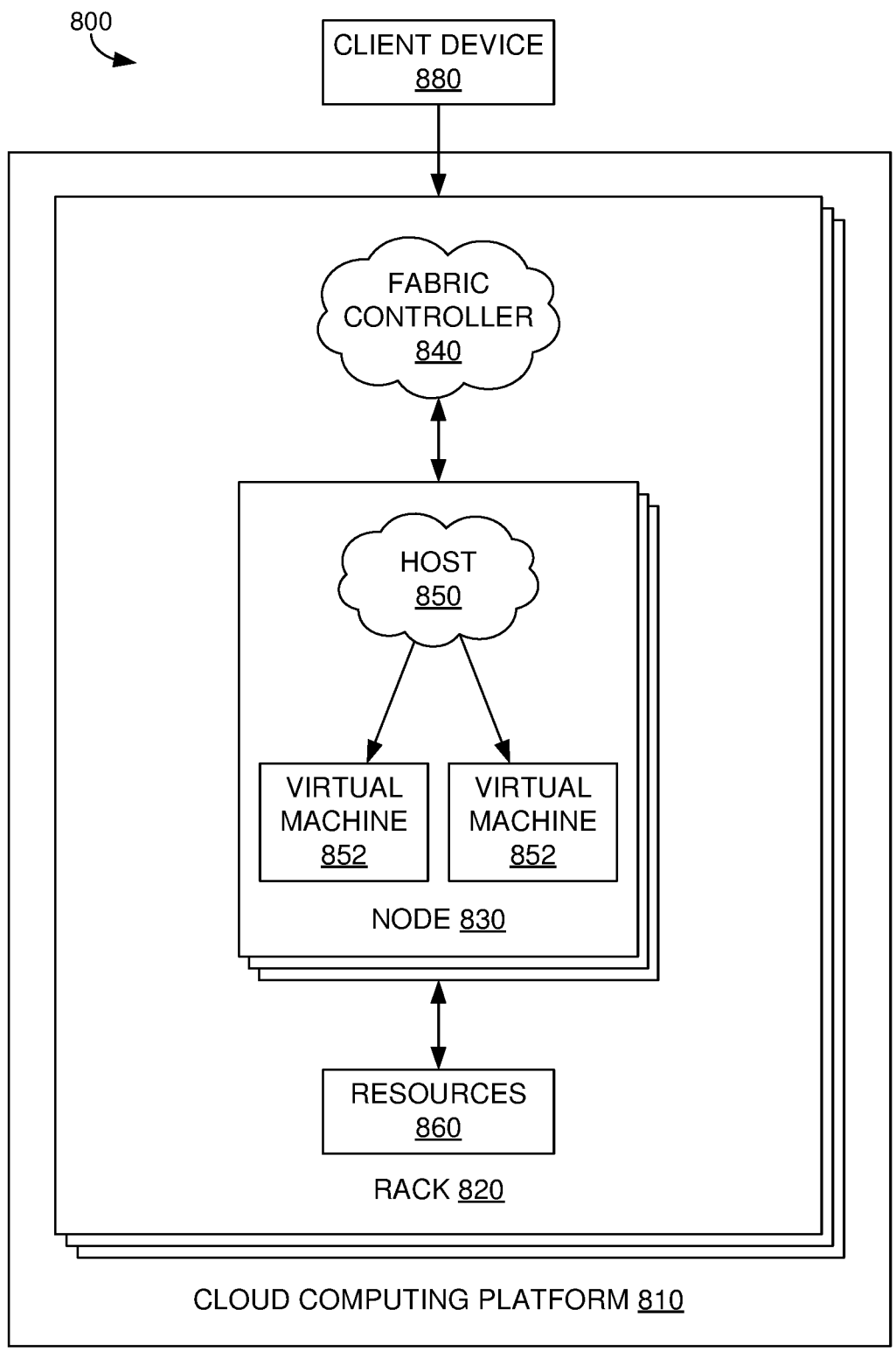
FIG. 8 is a block diagram of an exemplary distributed computing environment suitable for use in implementing embodiments described herein.

Referring now to FIG. 8, FIG. 8 illustrates an example distributed computing environment 800 in which implementations of the present disclosure may be employed. In particular, FIG. 8 shows a high level architecture of the on-demand emergency management system ("system") in cloud computing platform 810, where the system supports seamless modification of software component. It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions, etc.) can be used in addition to or instead of those shown.

Data centers can support distributed computing environment 800 that includes cloud computing platform 810, rack 820, and node 830 (e.g., computing devices, processing units, or blades) in rack 820. The system can be implemented with cloud computing platform 810 that runs cloud services across different data centers and geographic regions. Cloud computing platform 810 can implement fabric controller 840 component for provisioning and managing resource allocation, deployment, upgrade, and management of cloud services. Typically, cloud computing platform 810 acts to store data or run service applications in a distributed manner. Cloud computing infrastructure 810 in a data center can be configured to host and support operation of endpoints of a particular service application. Cloud computing infrastructure 810 may be a public cloud, a private cloud, or a dedicated cloud.

Node 830 can be provisioned with host 850 (e.g., operating system or runtime environment) running a defined software stack on node 830. Node 830 can also be configured to perform specialized functionality (e.g., compute nodes or storage nodes) within cloud computing platform 810. Node 830 is allocated to run one or more portions of a service application of a tenant. A tenant can refer to a customer utilizing resources of cloud computing platform 810. Service application components of cloud computing platform 810 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 830, nodes 830 may be partitioned into virtual machines (e.g., virtual machine 852 and virtual machine 854). Physical machines can also concurrently run separate service applications. The virtual machines or physical machines can be configured as individualized computing environments that are supported by resources 860 (e.g., hardware resources and software resources) in cloud computing platform 810. It is contemplated that resources can be configured for specific service applications. Further, each service application may be divided into functional portions such that each functional portion is able to run on a separate virtual machine. In cloud computing platform 810, multiple servers may be used to run service applications and perform data storage operations in a cluster. In particular, the servers may perform data operations independently but exposed as a single device referred to as a cluster. Each server in the cluster can be implemented as a node.

Client device 880 may be linked to a service application in cloud computing platform 810. Client device 880 may be any type of computing device, which may correspond to computing device 800 described with reference to FIG. 8, for example. Client device 880 can be configured to issue commands to cloud computing platform 810. In embodiments, client device 880 may communicate with service applications through a virtual Internet Protocol (IP) and load balancer or other means that direct communication requests to designated endpoints in cloud computing platform 810. The components of cloud computing platform 810 may communicate with each other over a network (not shown), which may include, without limitation, one or more local area networks (LANs) and/or wide area networks (WANs).

Example Computing Environment

Figure 9:
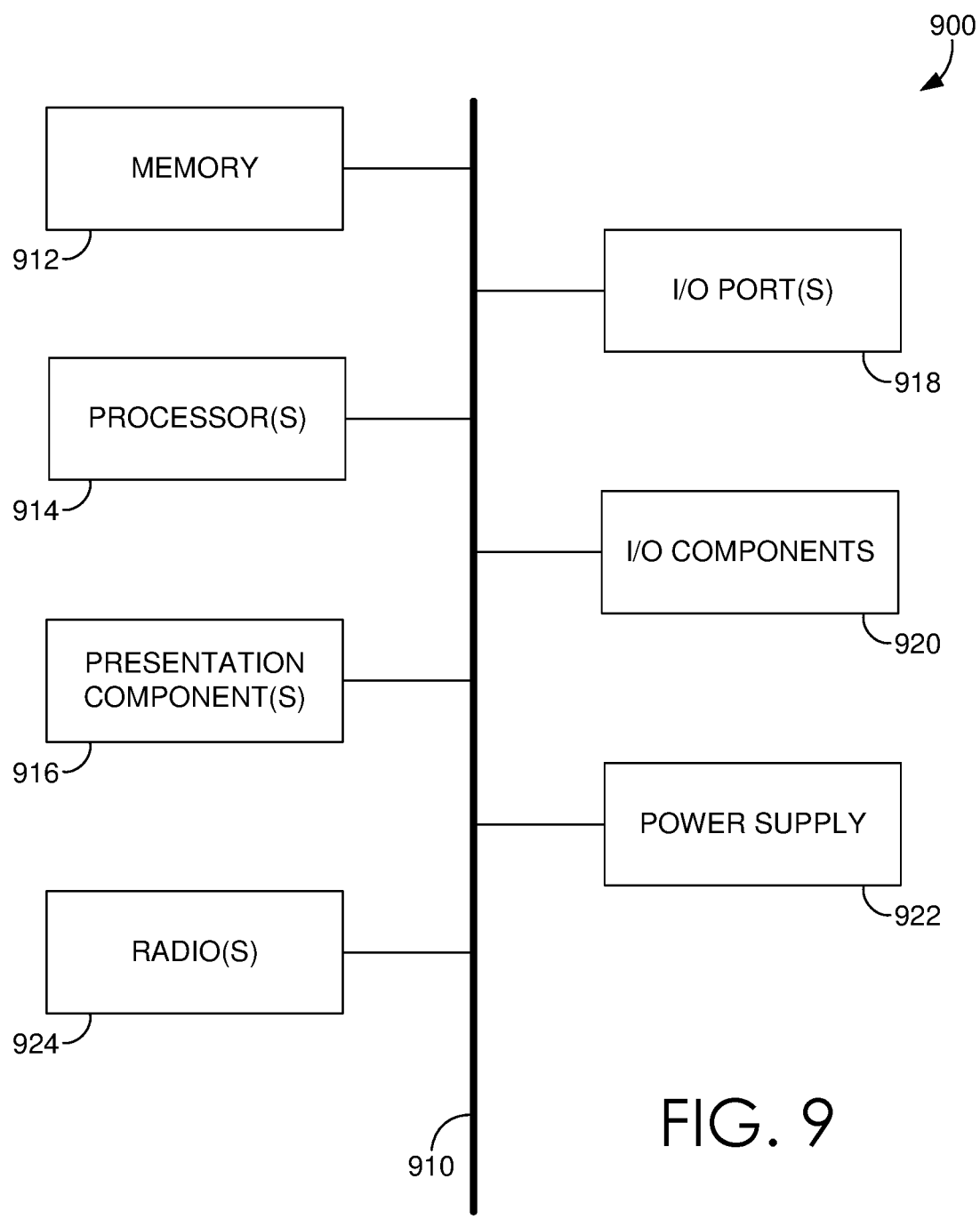
FIG. 9 is a block diagram of an exemplary computing environment suitable for use in implementing embodiments described herein.

Having briefly described an overview of embodiments of the present invention, an exemplary operating environment in which embodiments of the present invention may be implemented is described below in order to provide a general context for various aspects of the present invention. Referring initially to FIG. 9 in particular, an exemplary operating environment for implementing embodiments of the present invention is shown and designated generally as computing device 900. Computing device 900 is but one example of a suitable computing environment and is not intended to suggest any limitation as to the scope of use or functionality of the invention. Neither should computing device 900 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 9, computing device 900 includes bus 910 that directly or indirectly couples the following devices: memory 912, one or more processors 914, one or more presentation components 916, input/output ports 918, input/output components 920, and illustrative power supply 922. Bus 910 represents what may be one or more buses (such as an address bus, data bus, or combination thereof). The various blocks of FIG. 9 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 9 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc.

With reference to the on-demand emergency management system, embodiments described herein support autonomous renewal and distribution of secrets. The on-demand emergency management system components refer to integrated components for autonomous renewal and distribution of secrets. The integrated components refer to the hardware architecture and software framework that support functionality within the system. The hardware architecture refers to physical components and interrelationships thereof and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the on-demand emergency management system can include an API library that includes specifications for routines, data structures, object classes, and variables may support the interaction between the hardware architecture of the device and the software framework of the on-demand emergency management system. These APIs include configuration specifications for the on-demand emergency management system such that the different components therein can communicate with each other in the on-demand emergency management system, as described herein. A system, as used herein, refers to any device, process, or service or combination thereof. A system may be implemented using components as hardware, software, firmware, a special-purpose device, or any combination thereof. A system may be integrated into a single device or it may be distributed over multiple devices. The various components of a system may be co-located or distributed. The system may be formed from other systems and components thereof. It should be understood that this and other arrangements described herein are set forth only as examples.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the on-demand emergency management system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A system for providing on-demand emergency management in distributed computing systems, the system comprising:
one or more hardware processors and memory configured to provide computer program instructions to the one or more hardware processors;
an on-demand secret manager configured to:
access a request to perform emergency management operations, wherein the emergency management operations comprise one of the following: certificate update operations or managed-secrets rollover operations;
based on the request, determine to initiate the certificate update operations or the managed-secrets rollover operations, and wherein, during the certificate update operations, the on-demand secret manager is further configured to:
generate a certificate update secret package, wherein the certificate update secret package comprises a new secret state, wherein a client secret manager is configured to install the new secret state of the certificate update secret package on a client secret store of a virtual machine running the client secret manager, wherein the certificate update secret package is accessed from a corresponding host machine of the virtual machine; and
trigger deployment of the certificate update secret package from a secret package store, wherein the certificate update secret package is deployed to a first plurality of host machines; and
during the managed-secrets rollover operations, the on-demand secret manager is configured to:
generate a managed-secrets rollover secret package, wherein the managed-secrets rollover secret package comprises a notification-based new secret state, wherein the client secret manager is configured to, based on the managed-secrets rollover secret package having the notification-based new secret state, poll a distributed secrets management service (dSMS) to refresh the client secret store, wherein the managed-secrets rollover secret package is accessed from a corresponding host machine of the virtual machine; and
trigger deployment of the managed-secrets rollover secret package from the secret package store, wherein the managed-secrets rollover secret package is deployed to a second plurality of host machines.

2. The system of claim 1, wherein the request comprises a defined set of logic, policies, tasks, and machines for executing the emergency management operations, wherein the on-demand secret manager is configured to generate an interface for centralized management of the set of logic, policies, tasks, and machines for the emergency management operations.

3. The system of claim 1, further comprising:
a host secret manager configured to:
during the certificate update operations:
access the certificate update secret package in the secret package store; and
communicate the certificate update secret package to one or more client secret managers on virtual machines running on a corresponding host machine of the host secret manager; and
during the managed-secrets rollover operations:
listen for the managed-secrets rollover secret package in the secret package store; and
based on the managed-secrets rollover secret package having the notification-based new secret state, poll the dSMS to refresh a host secret store on a corresponding host machine of the host secret manager.

4. The system of claim 3, wherein the host secret manager processes the certificate update secret package or the managed-secrets rollover secret package using a pre-installation environment that prioritizes installation of new secrets in the host secret store over one or more boot operations of the host machine.

5. The system of claim 3, further comprising:
the client secret manager configured to:
during the certificate update operations:
access the certificate update secret package; and
install the new secret state of the certificate update secret package; and
during managed-secrets rollover operations:
access managed-secrets secret package; and
based on the managed-secrets rollover secret package having the notification-based new secret state, poll the dSMS to refresh the client secret store.

6. The system of claim 5, wherein the host secret manager and client secret manager are further configured to execute cache flushing operations to prevent access to cached versions of certificates to cause new certificates to take immediate effect without a reboot.

7. The system of claim 5, wherein the client secret manager is configured to process the certificate update secret package or the managed-secrets rollover secret package using a pre-installation environment that prioritizes installation of new secrets in the client secret store over one or more boot operations of the virtual machine.

8. The system of claim 1, wherein the on-demand secret manager is further configured to:
sign the certificate update secret package or the managed-secrets rollover secret package with a private key, and
a host secret manager and a client secret manager are further configured to:
verify a signature of the certificate update secret package or a signature of the managed-secrets rollover secret package.

9. The system of claim 8, wherein a signing certificate for verifying the signature of the certificate update secret package or the signature of the managed-secrets rollover secret package is an image-embedded mechanism in the host secret manager and the client secret manager.

10. The system of claim 1, further comprising the dSMS configured to:
receive a secrets request;
trigger a secrets rollover in one or more secret resources; and
communicate new secrets states based on polling requests received from host secret managers and client secret managers during the managed-secrets rollover operations.

11. One or more computer storage media storing computer-useable instructions that, when used by one or more computing devices, cause the one or more computing devices to perform operations comprising:
generating a request to perform emergency management operations, wherein the emergency management operations comprise one of the following: certificate update operations or managed-secrets rollover operations;
based on the request, determining to initiate the certificate update operations or the managed-secrets rollover operations, wherein, during the certificate update operations, the operations comprise:
generating a certificate update secret package, wherein the certificate update secret package comprises a new secret state, wherein a client secret manager is configured to install the new secret state of the certificate update secret package on a client secret store of a virtual machine running the client secret manager, wherein the certificate update secret package is accessed from a corresponding host machine of the virtual machine; and
triggering deployment of the certificate update secret package from a secret package store, wherein the certificate update secret package is deployed to a first plurality of host machines; and
during the managed-secrets rollover operations, the operations comprise:
generating a managed-secrets rollover secret package, wherein the managed-secrets rollover secret package comprises a notification-based new secret state, wherein the client secret manager is configured to, based on the managed-secrets rollover secret package having the notification-based new secret state, poll a distributed secrets management service (dSMS) to refresh the client secret store, wherein the managed-secrets rollover secret package is accessed from a corresponding host machine of the virtual machine; and
triggering deployment of the managed-secrets rollover secret package from the secret package store, wherein the managed-secrets rollover secret package is deployed to a second plurality of host machines.

12. The media of claim 11, further comprising causing deployment of a host secret manager on a host machine and the client secret manager on a virtual machine, wherein the host secret manager and the client secret manager are configured with instructions to process the certificate update secret package or the managed-secrets rollover package using a pre-installation environment that prioritizes installation of new secrets in a host secret store over one or more boot operations of the host machine or the virtual machine.

13. The media of claim 11, further comprising generating an interface for centralized management of a defined set of logic, policies, tasks, and machines for emergency management operations, wherein the request comprises the defined set of logic, policies, tasks, and machines for executing the emergency management operations.

14. The media of claim 11, further comprising signing the certificate update secret package or managed-secrets rollover secret package with a private key to cause a host state manager and the client secret manager to verify the signature of the signed certificate update secret package or the signature of the managed-secrets rollover secret package, wherein a signing certificate for performing verifying the signature is an image-embedded mechanism in the host state manager and the client secret manager.

15. The media of claim 11, further comprising communicating a secrets request corresponding to the request to the dSMS to cause the dSMS to trigger a rollover in one or more secret resources.

16. A method for on-demand emergency management in distributed computing systems, the method comprising:
during certificate update operations:
accessing a certificate update secret package, wherein a client secret manager is configured to install a new secret state of the certificate update secret package on a client secret store of a virtual machine running the client secret manager, wherein the certificate update secret package is accessed from a corresponding host machine of the virtual machine;
processing the certificate update secret package using a pre-installation environment that prioritizes installation of new secrets, in the client secret store, over one or more boot operations; and
installing the new secret state of the certificate update secret package based on a defined set of logic, policies, or tasks identified in the certificate update secret package; and during managed-secrets rollover operations:
  accessing a managed-secrets secret package; wherein the client secret manager is configured to, based on the managed-secrets rollover secret package having a notification-based new secret state, poll a distributed secrets management service (dSMS) to refresh the client secret store, wherein the managed-secrets rollover secret package is accessed from a corresponding host machine of the virtual machine;
  based on the managed-secrets rollover secret package having the notification-based new secret state, polling a distributed secrets management service (dSMS) to refresh a host secret store; and
  installing a certificate state in the client secret store.

17. The method of claim 16, further comprising executing a cache flushing operation to prevent access to cached versions of certificates to cause new certificates to take immediate effect without a reboot.

18. The method of claim 16, further comprising verifying a signature of the certificate update secret package, wherein a signing certificate for verifying the signature is an imaged-embedded mechanism.

19. The method of claim 16, wherein the certificate update operations and the manage-secrets rollover operations are performed based on a request that comprises a defined set of logic, policies, tasks, and machines for executing emergency management operations via an interface for centralized management of the set of logic, policies, tasks, and machines for the emergency management operations.

20. The method of claim 16, further comprising a host secret manager:
  during the certificate update operations:
    accessing the certificate update secret package in a secret package store; and
    communicating the certificate update secret package to one or more client secret managers on virtual machines running on the host machine of the host secret manager; and
  during the managed-secrets rollover operations:
    listening for the managed-secrets rollover secret package in the secret package store; and
    based on the managed-secrets rollover secret package having the notification-based new secret state, poll the dSMS service to refresh a host secret store on the host machine.

\* \* \* \* \*